US012658088B2

(12) United States Patent
No et al.

(10) Patent No.: US 12,658,088 B2
(45) Date of Patent: Jun. 16, 2026

(54) DRIVER AND DISPLAY DEVICE

(71) Applicant: Samsung Display Co., LTD., Yongin-si (KR)

(72) Inventors: Sang Yong No, Yongin-si (KR); Kyungho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/964,838

(22) Filed: Dec. 2, 2024

(65) Prior Publication Data

US 2025/0336323 A1 Oct. 30, 2025

(30) Foreign Application Priority Data

Apr. 25, 2024 (KR) ........................ 10-2024-0055568

(51) Int. Cl.
*G09G 3/20* (2006.01)
*G09G 3/3266* (2016.01)
*G09G 3/36* (2006.01)

(52) U.S. Cl.
CPC ............. *G09G 3/20* (2013.01); *G09G 3/3266* (2013.01); *G09G 3/3677* (2013.01); *G09G 2310/0267* (2013.01); *G09G 2310/0286* (2013.01); *G09G 2330/021* (2013.01)

(58) Field of Classification Search
CPC ............. G09G 3/20; G09G 2310/0267; G09G 2310/0286; G09G 2330/021; G09G 3/3266; G09G 3/3677; G09G 2300/0426; G09G 2300/0842; H10D 30/67
See application file for complete search history.

(56) References Cited

U.S. PATENT DOCUMENTS

2024/0138187 A1* 4/2024 Lee ...................... G09G 3/3266
2024/0395195 A1* 11/2024 Ke ........................... G09G 3/32
2025/0273163 A1* 8/2025 No ....................... G09G 3/3266

FOREIGN PATENT DOCUMENTS

KR 102222680 B1 3/2021

* cited by examiner

*Primary Examiner* — Julie Anne Watko
(74) *Attorney, Agent, or Firm* — CANTOR COLBURN LLP

(57) ABSTRACT

A stage of a driver includes a first transistor which transmits an input signal to a first node in response to a clock signal, a second transistor connected between the first node and a second node, and including a gate which receives a first low gate voltage, a third transistor which transmits a high gate voltage to a third node in response to a voltage of the first node or a voltage of the second node, a fourth transistor which transmits a second low gate voltage to the third node in response to the voltage of the second node, a fifth transistor which outputs the high gate voltage as an output signal in response to a voltage of the third node, and a sixth transistor which outputs the second low gate voltage as the output signal in response to the voltage of the second node.

18 Claims, 12 Drawing Sheets

DRIVER AND DISPLAY DEVICE

This application claims priority to Korean Patent Application No. 10-2024-0055568, filed on Apr. 25, 2024, and all the benefits accruing therefrom under 35 U.S.C. § 119, the content of which in its entirety is herein incorporated by reference.

BACKGROUND

1. Field

Embodiments of the invention relate to a display device, and more particularly to a driver formed in a display panel, and a display device including the driver.

2. Description of the Related Art

A driver (e.g., a gate driver and/or an emission driver) of a display device may sequentially provide signals (e.g., gate signals and/or emission signals) to pixels of a display panel on a row-by-row basis. To sequentially provide the signals on the row-by-row basis, the driver may be implemented in a form of a shift register including a plurality of stages.

SUMMARY

In a display device, a driver may be implemented as an integrated circuit, or may be integrated or formed in a display panel. In a case where the driver is integrated in the display panel, it may be desirable for each stage of the driver to have a simple configuration.

Some embodiments provide a driver in which each stage has a simple configuration and power consumption can be reduced.

Some embodiments provide a display device including a driver in which each stage has a simple configuration and power consumption can be reduced.

According to embodiments, a driver includes a plurality of stages. In such embodiments, a stage of the plurality of stages includes a first transistor which transmits an input signal to a first node in response to a clock signal, a second transistor connected between the first node and a second node, and including a gate which receives a first low gate voltage, a third transistor which transmits a high gate voltage to a third node in response to a voltage of the first node or a voltage of the second node, a fourth transistor which transmits a second low gate voltage to the third node in response to the voltage of the second node, a fifth transistor which outputs the high gate voltage as an output signal in response to a voltage of the third node, and a sixth transistor which outputs the second low gate voltage as the output signal in response to the voltage of the second node.

In embodiments, the first low gate voltage may be higher than the second low gate voltage.

In embodiments, the output signal may have a swing width between the high gate voltage and the second low gate voltage, and the clock signal may have a swing width between the high gate voltage and the first low gate voltage.

In embodiments, the first, second, third, fifth and sixth transistors may be P-type metal-oxide-semiconductor (PMOS) transistors, and the fourth transistor may be an N-type metal-oxide-semiconductor (NMOS) transistor.

In embodiments, the first transistor may include a gate which receives the clock signal, a first terminal which receives the input signal, and a second terminal connected to the first node.

In embodiments, the second transistor may include the gate connected to a line which transmits the first low gate voltage, a first terminal connected to the first node, and a second terminal connected to the second node.

In embodiments, the third transistor may include a gate connected to the first node, a first terminal connected to a line which transmits the high gate voltage, and a second terminal connected to the third node.

In embodiments, the third transistor may include a gate connected to the second node, a first terminal connected to a line which transmits the high gate voltage, and a second terminal connected to the third node.

In embodiments, the fourth transistor may include a gate connected to the second node, a first terminal connected to a line which transmits the second low gate voltage, and a second terminal connected to the third node.

In embodiments, the fifth transistor may include a gate connected to the third node, a first terminal connected to a line which transmits the high gate voltage, and a second terminal connected to an output node, from which the output signal is output.

In embodiments, the sixth transistor may include a gate connected to the second node, a first terminal connected to an output node, from which the output signal is output, and a second terminal connected to a line which transmits the second low gate voltage.

In embodiments, the stage may further include a first capacitor connected between an output node, from which the output signal is output and the second node.

In embodiments, the stage may further include a second capacitor connected between a line which transmits the high gate voltage and the third node.

In embodiments, the stage may further include a seventh transistor including a gate which receives a global reset signal, a first terminal connected to a line which transmits the high gate voltage, and a second terminal connected to the first node.

According to embodiments, a display device includes a display panel including a plurality of pixels, a data driver which provides data signals to the plurality of pixels, a gate driver which provides gate signals to the plurality of pixels, an emission driver which provides emission signals to the plurality of pixels, and a controller which controls the data driver, the gate driver and the emission driver. In such embodiments, at least one selected from the gate driver and the emission driver includes a plurality of stages. In such embodiments, a stage of the plurality of stages includes a first transistor which transmits an input signal to a first node in response to a clock signal, a second transistor connected between the first node and a second node, and including a gate which receives a first low gate voltage, a third transistor which transmits a high gate voltage to a third node in response to a voltage of the first node or a voltage of the second node, a fourth transistor which transmits a second low gate voltage to the third node in response to the voltage of the second node, a fifth transistor which outputs the high gate voltage as an output signal in response to a voltage of the third node, and a sixth transistor which outputs the second low gate voltage as the output signal in response to the voltage of the second node.

In embodiments, the first low gate voltage may be higher than the second low gate voltage.

In embodiments, the output signal may have a swing width between the high gate voltage and the second low gate voltage, and the clock signal may have a swing width between the high gate voltage and the first low gate voltage.

In embodiments, the first, second, third, fifth and sixth transistors may be P-type metal-oxide-semiconductor (PMOS) transistors, and the fourth transistor may be an N-type metal-oxide-semiconductor (NMOS) transistor.

In embodiments, the first transistor may include a gate which receives the clock signal, a first terminal which receives the input signal, and a second terminal connected to the first node, the second transistor may include the gate connected to a line which transmits the first low gate voltage, a first terminal connected to the first node, and a second terminal connected to the second node, the third transistor may include a gate connected to the first node, a first terminal connected to a line which transmits the high gate voltage, and a second terminal connected to the third node, the fourth transistor may include a gate connected to the second node, a first terminal connected to a line which transmits the second low gate voltage, and a second terminal connected to the third node, the fifth transistor may include a gate connected to the third node, a first terminal connected to a line which transmits the high gate voltage, and a second terminal connected to an output node, from which the output signal is output, and the sixth transistor may include a gate connected to the second node, a first terminal connected to the output node, and a second terminal connected to a line which transmits the second low gate voltage.

In embodiments, the stage may further include a first capacitor connected between an output node, from which the output signal is output, and the second node.

As described above, in a driver and a display device according to embodiments, a stage of the driver may have a simple configuration including first through sixth transistors. Further, in the driver, a swing width of a clock signal may be smaller than a swing width of an output signal. Accordingly, the driver may stably operate while reducing power consumption.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
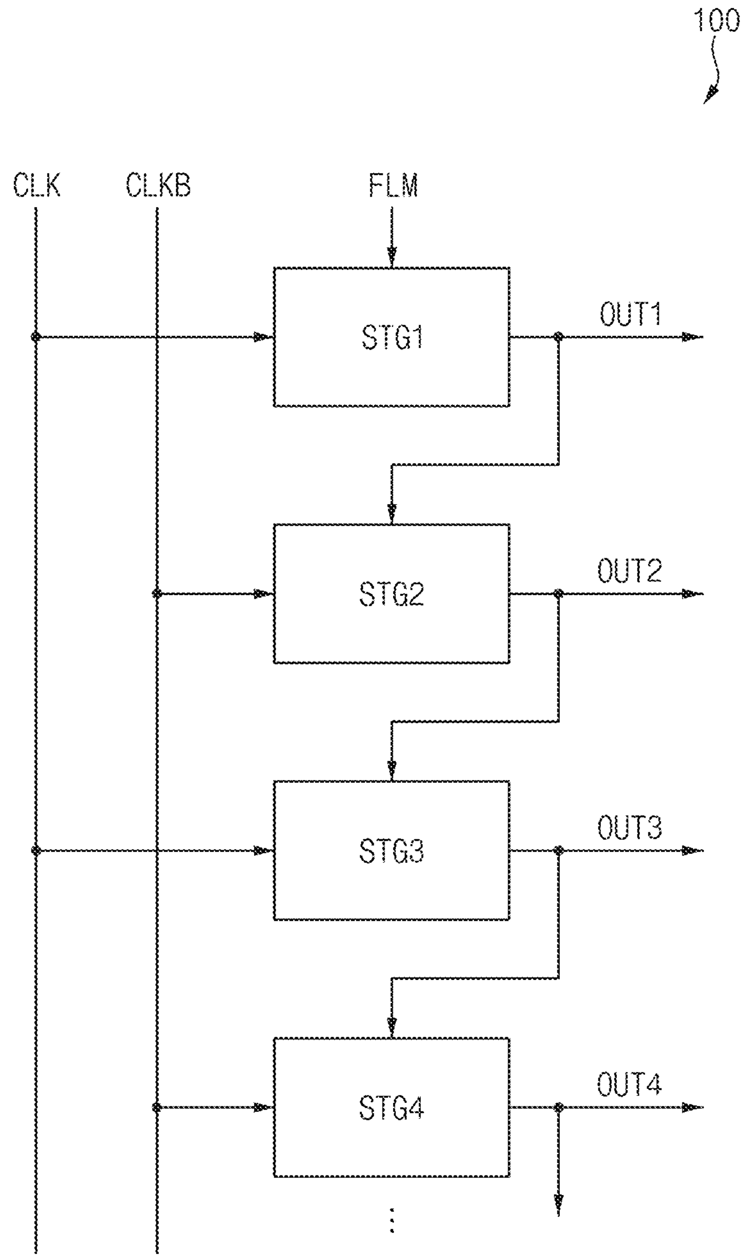
FIG. 1 is a block diagram illustrating a driver according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 2:
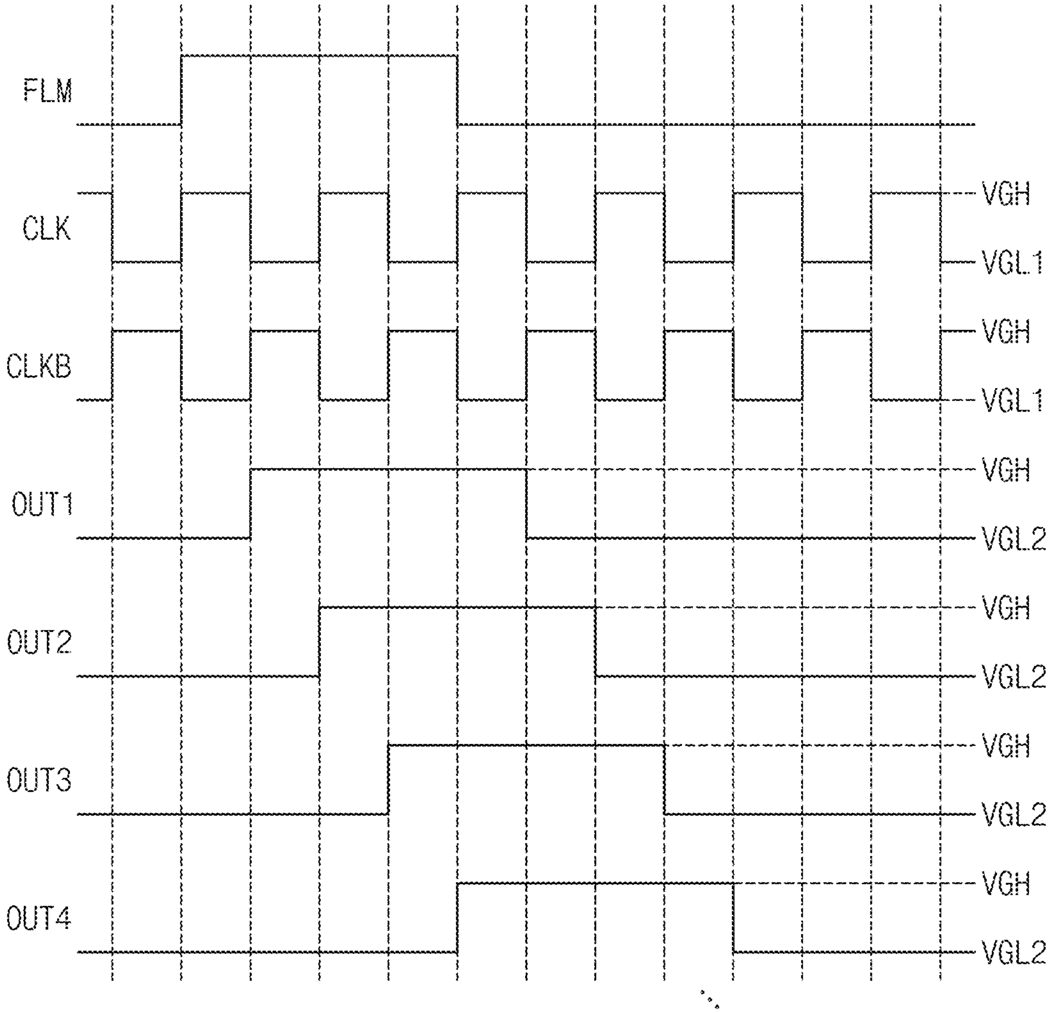
FIG. 2 is a timing diagram for describing an example of an operation of the driver of FIG. 1.

FIG. 1 is a block diagram illustrating a driver according to embodiments, and FIG. 2 is a timing diagram for describing an example of the n operation of a driver of FIG. 1.

Referring to FIG. 1, a driver 100 according to embodiments may include a plurality of stages STG1, STG2, STG3, STG4, etc. The driver 100 may be implemented in a form of a shift register, in which the plurality of stages STG1, STG2, STG3, STG4, etc. sequentially output output signals OUT1, OUT2, OUT3, OUT4, etc. In some embodiments, the driver 100 may be a driver included in a display device, and may be formed in a display panel of the display device. In an embodiment, for example, the driver 100 may be integrated or formed on a substrate of the display panel, but is not limited thereto.

The plurality of stages STG1, STG2, STG3, STG4, etc. may sequentially output the output signals OUT1, OUT2, OUT3, OUT4, etc. based on a start signal FLM, a clock signal CLK and an inverted clock signal CLKB. Further, a first stage STG1 may receive the start signal FLM as an input signal, and each of the subsequent stages STG2, STG3, STG4, etc. may receive an output signal of a previous stage as an input signal. In an embodiment, for example, a second stage STG2 may receive a first output signal OUT1 of the first stage STG1 as an input signal, a third stage STG3 may receive a second output signal OUT2 of the second stage STG2 as an input signal, and a fourth stage STG4 may receive a third output signal OUT3 of the third stage STG3 as an input signal.

Further, in some embodiments, each odd-numbered stage STG1, STG3, etc. may start outputting the output signal OUT1, OUT3, etc. when the clock signal CLK has a low level, and each even-numbered stage STG2, STG4, etc. may start outputting the output signal OUT2, OUT4, etc. when the inverted clock signal CLKB has the low level. In an embodiment, for example, as illustrated in FIGS. 1 and 2, when the clock signal CLK becomes the low level after the start signal FLM becomes a high level, the first stage STG1 may start outputting the first output signal OUT1 having the high level. Further, when the clock signal CLK becomes the low level after the start signal FLM becomes the low level, the first stage STG1 may start outputting the first output signal OUT1 having the low level. When the inverted clock signal CLKB becomes the low level after the first output signal OUT1 becomes the high level, the second stage STG2 may start outputting the second output signal OUT2 having the high level. Further, when the inverted clock signal CLKB becomes the low level after the first output signal OUT1 becomes the low level, the second stage STG2 may start outputting the second output signal OUT2 having the low level. When the clock signal CLK becomes the low level after the second output signal OUT2 becomes the high level, the third stage STG3 may start outputting the third output signal OUT3 having the high level. Further, when the clock signal CLK becomes the low level after the second output signal OUT2 becomes the low level, the third stage STG3 may start outputting the third output signal OUT3 having the low level. When the inverted clock signal CLKB becomes the low level after the third output signal OUT3 becomes the high level, the fourth stage STG4 may start outputting the fourth output signal OUT4 having the high level. Further, when the inverted clock signal CLKB becomes the low level after the third output signal OUT3 becomes the low level, the fourth stage STG4 may start outputting the fourth output signal OUT4 having the low level. In this manner, the plurality of stages STG1, STG2, STG3, STG4, etc. may sequentially output the output signals OUT1, OUT2, OUT3, OUT4, etc. by delaying or shifting the output signals OUT1, OUT2, OUT3, OUT4, etc. by half a period of the clock signal CLK.

In the driver 100 according to embodiments, as illustrated in FIG. 2, each output signal OUT1, OUT2, OUT3, OUT4, etc. may have a swing width between a high gate voltage VGH and a second low gate voltage VGL2, but the clock signal CLK and the inverted clock signal CLKB may have a swing width between the high gate voltage VGH and a first low gate voltage VGL1. Further, in some embodiments, the first low gate voltage VGL1 may be higher than the second low gate voltage VGL2. In an embodiment, for example, the high gate voltage VGH may be, but is not limited to, about 6.5 volts (V), the first low gate voltage VGL1 may be, but is not limited to, about −6 V, and the second low gate voltage VGL2 may be, but is not limited to, about −9.5 V. Accordingly, each output signal OUT1, OUT2, OUT3, OUT4, etc. may have a swing width from about −9.5 V to about 6.5 V, but the clock signal CLK and the inverted clock signal CLKB may have a swing width from about −6 V to about 6.5 V. Accordingly, in the driver 100 according to embodiments, power consumption for charging and discharging clock signal lines may be reduced, and power consumption of the driver 100 and a display device including the driver 100 may be reduced.

Although FIG. 2 illustrates an embodiment in which each of the clock signal CLK and the inverted clock signal CLKB has a clock duty of about 50%, the clock signal CLK and the inverted clock signal CLKB provided to the driver 100 according to embodiments are not limited to the example of FIG. 2. In another embodiment, for example, to ensure that a low period of the clock signal CLK and a low period of the inverted clock signal CLKB do not overlap (in time), each of the clock signal CLK and the inverted clock signal CLKB may have a low period shorter than a high period, and the low period of the clock signal CLK and the low period of the inverted clock signal CLKB may have a predetermined time interval.

Figure 3:
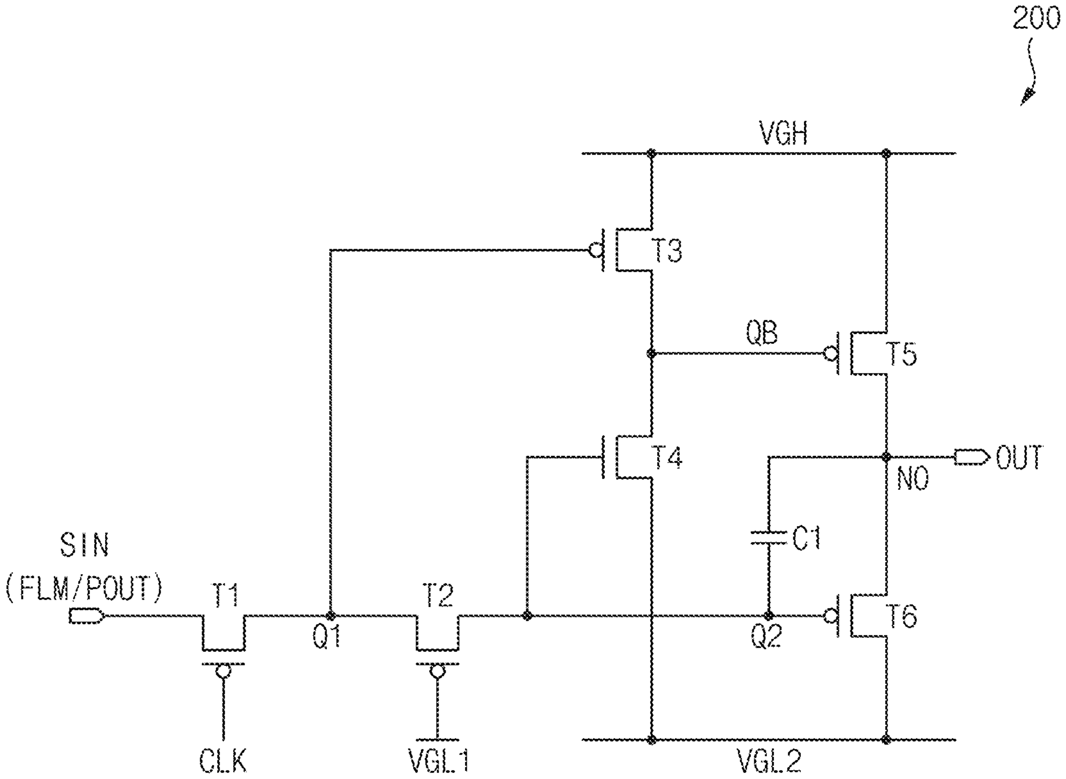
FIG. 3 is a circuit diagram illustrating a stage of a driver according to embodiments.

FIG. 3 is a circuit diagram illustrating a stage of a driver according to embodiments.

Referring to FIG. 3, a stage 200 of a driver according to embodiments may include a first transistor T1, a second transistor T2, a third transistor T3, a fourth transistor T4, a fifth transistor T5 and a sixth transistor T6. In some embodiments, the stage 200 may further include a first capacitor C1.

The first transistor T1 may transmit an input signal SIN to a first node Q1 in response to a clock signal CLK. In some embodiments, the input signal SIN may be a start signal FLM with respect to a first stage of the driver, and an output signal of a previous stage with respect to each of subsequent stages. Further, the first transistor T1 of an odd-numbered stage may receive the clock signal CLK as illustrated in FIG. 3, and the first transistor T1 of an even-numbered stage may receive an inverted clock signal instead of the clock signal CLK. In some embodiments, the first transistor T1 may include a gate which receives the clock signal CLK, a first terminal which receives the input signal SIN, and a second terminal connected to the first node Q1.

The second transistor T2 may be connected between the first node Q1 and a second node Q2, and may include a gate which receives a first low gate voltage VGL1. Since the second transistor T2 receives the first low gate voltage VGL1 at the gate for turning on the second transistor T2, the second transistor T2 may be referred to as an always-on transistor (AOT). In some embodiments, the second transistor T2 may include the gate connected to a line which transmits the first low gate voltage VGL1, a first terminal connected to the first node Q1, and a second terminal connected to the second node Q2.

The third transistor T3 may transmit a high gate voltage VGH to a third node QB in response to a voltage of the first node Q1. In some embodiments, the third transistor T3 may include a gate connected to the first node Q1, a first terminal connected to a line which transmits the high gate voltage VGH, and a second terminal connected to the third node QB.

The fourth transistor T4 may transmit a second low gate voltage VGL2 to the third node QB in response to a voltage of the second node Q2. In some embodiments, the fourth transistor T4 may include a gate connected to the second node Q2, a first terminal connected to a line which transmits the second low gate voltage VGL2, and a second terminal connected to the third node QB.

The fifth transistor T5 may output the high gate voltage VGH as an output signal OUT in response to a voltage of the third node QB. In some embodiments, the fifth transistor T5 may include a gate connected to the third node QB, a first terminal connected to the line which transmits the high gate voltage VGH, and a second terminal connected to an output node NO from which the output signal OUT is output.

The sixth transistor T6 may output the second low gate voltage VGL2 as the output signal OUT in response to the voltage of the second node Q2. In some embodiments, the sixth transistor T6 may include a gate connected to the second node Q2, a first terminal connected to the output node NO, and a second terminal connected to the line which transmits the second low gate voltage VGL2.

The first capacitor C1 may be connected between the output node NO and the second node Q2. The first capacitor C1 may be referred to as a boosting capacitor or a bootstrapping capacitor which performs a bootstrapping operation to boost the voltage of the second node Q2. In some embodiments, the first capacitor C1 may include a first electrode connected to the output node NO, and a second electrode connected to the second node Q2.

In some embodiments, the stage 200 may include both of a P-type transistor (e.g., a P-type metal-oxide-semiconductor (PMOS) transistor) and an N-type transistor (e.g., an N-type metal-oxide-semiconductor (NMOS) transistor). In an embodiment, for example, as illustrated in FIG. 3, the first, second, third, fifth and sixth transistors T1, T2, T4, T5 and T6 may be PMOS transistors, and the fourth transistor T4 may be an NMOS transistor. Further, in some embodiments, an active region of the PMOS transistor and an active region of the NMOS transistor may include different materials. In an embodiment, for example, the active region of the PMOS transistor may include, but is not limited to, polycrystalline silicon, e.g., low temperature polycrystalline silicon (LTPS). Further, the active region of the NMOS transistor may include, but is not limited to, an oxide semiconductor, an organic semiconductor, an amorphous silicon, etc.

The stage 200 of the driver according to embodiments may have a simple configuration including six transistors T1 through T6 (and one capacitor C1). Accordingly, the driver according to embodiments may be suitable for an embedded driver integrated in a display panel.

In some embodiments, the output signal OUT may have a swing width between the high gate voltage VGH and the second low gate voltage VGL2, but the clock signal CLK may have a swing width between the high gate voltage VGH and the first low gate voltage VGL1. Further, the first low gate voltage VGL1 may be higher than the second low gate voltage VGL2. Accordingly, the swing width of the clock signal CLK may be smaller than the swing width of the output signal OUT, and thus power consumption of the driver including the stage 200 may be reduced. Further, in the driver according to embodiments, although the swing width of the clock signal CLK is reduced, the driver including the stage 200 may stably operate.

Hereinafter, an example of an operation of the stage 200 will be described with reference to FIGS. 3 through 6.

Figure 4:
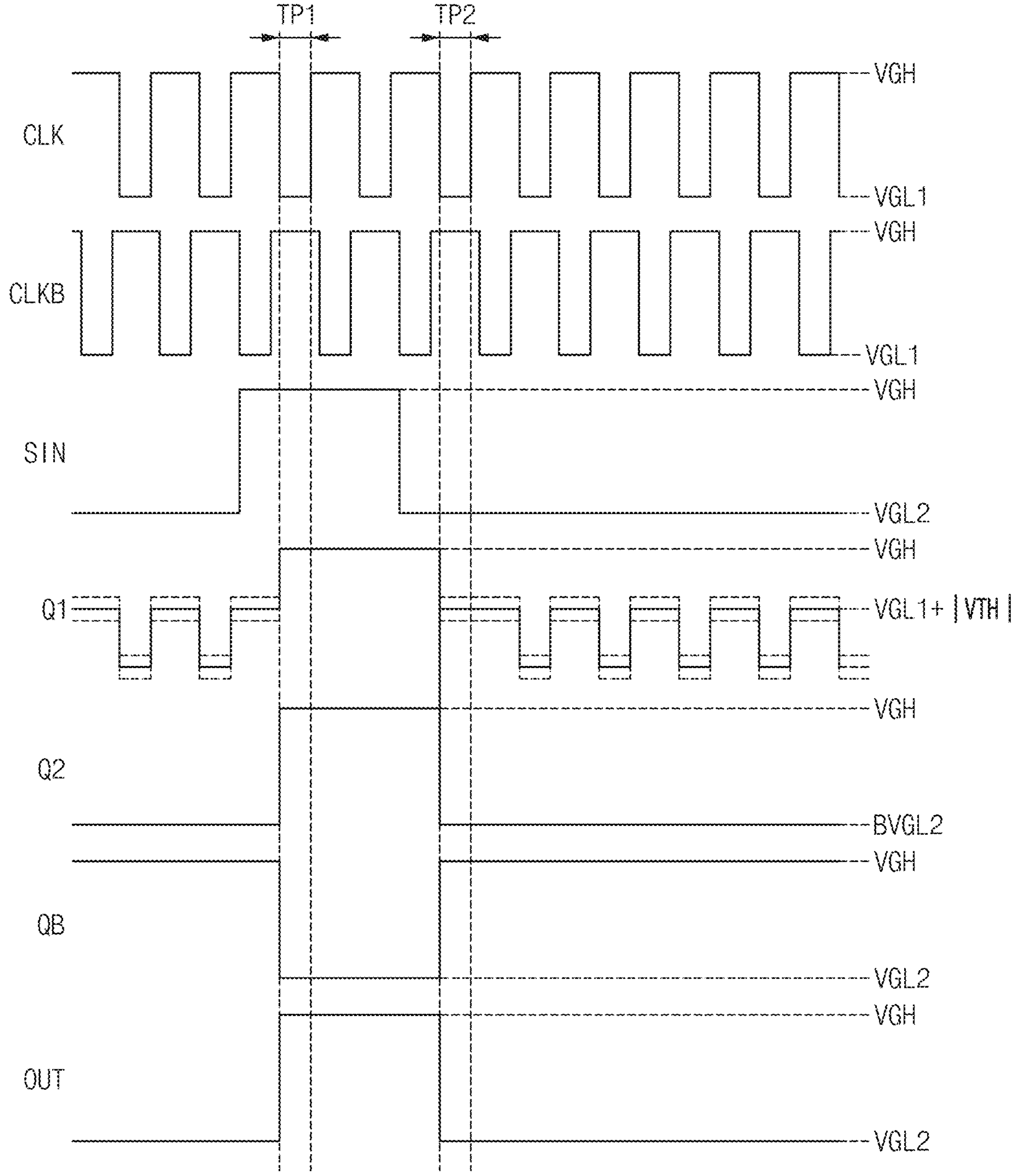
FIG. 4 is a timing diagram for describing an example of an operation of the stage of FIG. 3.
Figure 5:
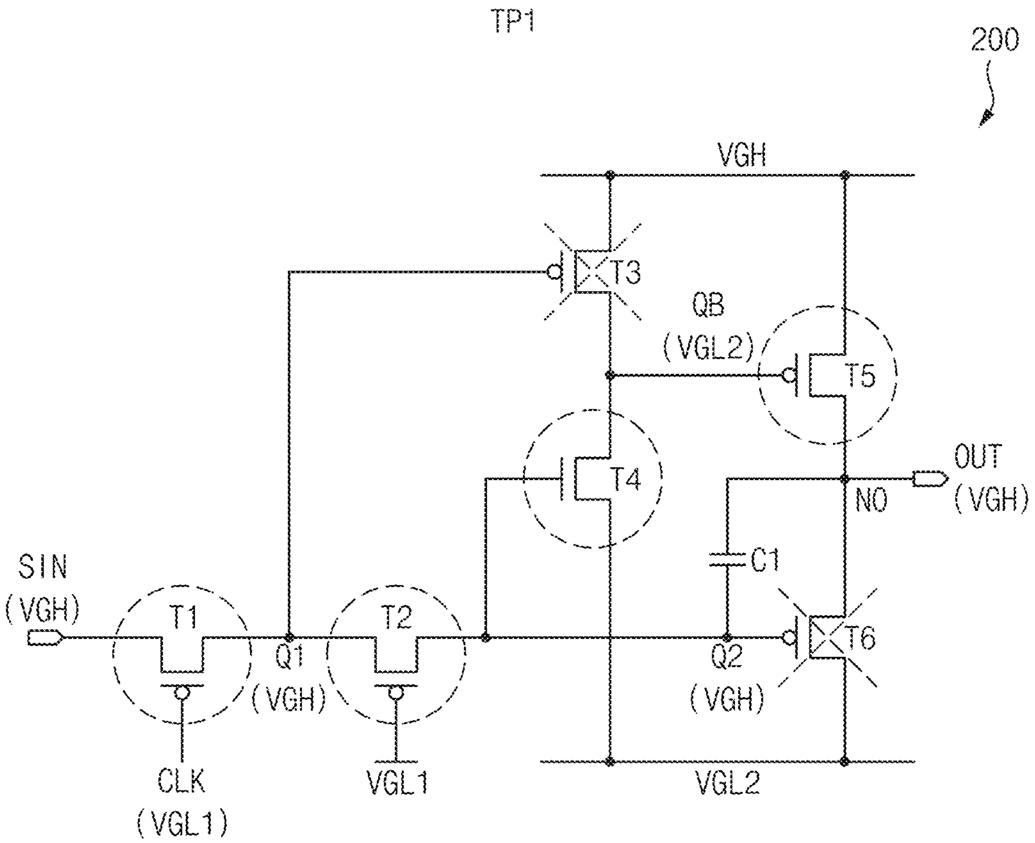
FIG. 5 is a circuit diagram for describing an example of an operation of the stage of FIG. 3 in a first time period.
Figure 6:
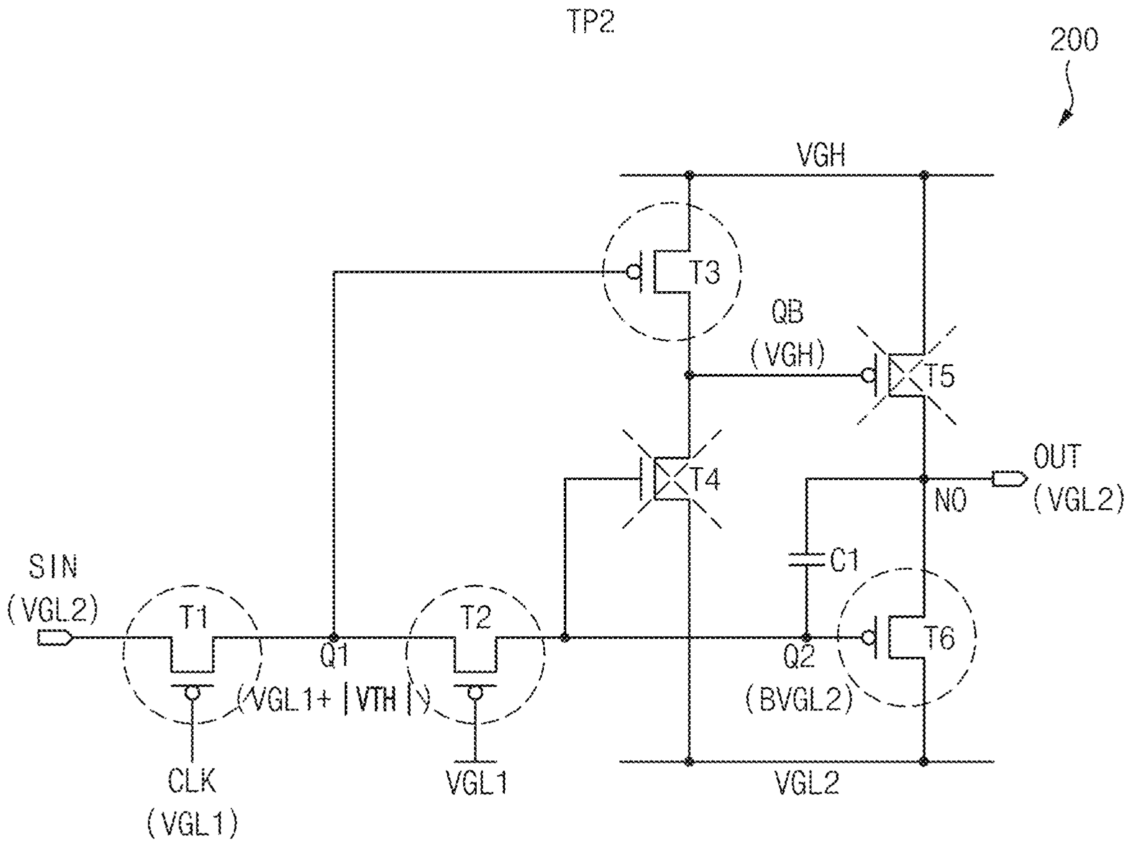
FIG. 6 is a circuit diagram for describing an example of an operation of the stage of FIG. 3 in a second time period.

FIG. 4 is a timing diagram for describing an example of an operation of the stage of FIG. 3, FIG. 5 is a circuit diagram for describing an example of an operation of the stage of FIG. 3 in a first time period, and FIG. 6 is a circuit diagram for describing an example of an operation of the stage of FIG. 3 in a second time period.

Referring to FIGS. 3 and 4, an embodiment of the stage 200 may start outputting the output signal OUT having the high gate voltage VGH when the clock signal CLK becomes the first low gate voltage VGL1 (or changes from the high gate voltage VGH to the first low gate voltage VGL1) after the input signal SIN has the high gate voltage VGH, and may start outputting the output signal OUT having the second low gate voltage VGL2 when the clock signal CLK becomes the first low gate voltage VGL1 after the input signal SIN has the second low gate voltage VGL2.

In a first time period TP1 in which the input signal SIN has the high gate voltage VGH and the clock signal CLK has the first low gate voltage VGL1, the stage 200 may output the output signal OUT having the high gate voltage VGH.

In an embodiment, for example, as illustrated in FIG. 5, during the first time period TP1, the first transistor T1 may be turned on in response to the clock signal CLK having the first low gate voltage VGL1, and may transmit the input signal SIN having the high gate voltage VGH to the first node Q1. Thus, the first node Q1 may have the high gate voltage VGH.

The second transistor T2 may be turned on in response to the first low gate voltage VGL1, and may transmit the high gate voltage VGH of the first node Q1 to the second node Q2. Thus, the second node Q2 may have the high gate voltage VGH.

Further, the third transistor T3 may be turned off in response to the high gate voltage VGH of the first node Q1, and the fourth transistor T4 may be turned on in response to the high gate voltage VGH of the second node Q2. The fourth transistor T4 may transmit the second low gate voltage VGL2 to the third node QB. Thus, the third node QB may have the second low gate voltage VGL2.

Further, the sixth transistor T6 may be turned off in response to the high gate voltage VGH of the second node Q2, and the fifth transistor T5 may be turned on in response to the second low gate voltage VGL2 of the third node QB. The fifth transistor T5 may output the high gate voltage VGH as the output signal OUT at the output node NO.

Thereafter, in a second time period TP2 in which the input signal SIN has the second low gate voltage VGL2 and the clock signal CLK has the first low gate voltage VGL1, the stage 200 may output the output signal OUT having the second low gate voltage VGL2.

In an embodiment, for example, as illustrated in FIG. 6, during the second time period TP2, the first transistor T1 may be turned on in response to the clock signal CLK having the first low gate voltage VGL1, and may transmit the input signal SIN having the second low gate voltage VGL2 to the first node Q1. Thus, the first node Q1 may be decreased from the high gate voltage VGH. Since the second low gate voltage VGL2 of the input signal SIN is lower than a voltage of the first node Q1, a source voltage of the first transistor T1 may be the voltage of the first node Q1. Thus, the first transistor T1 may be turned on until the voltage of the first node Q1 becomes a sum of the first low gate voltage VGL1 of the clock signal CLK and an absolute value |VTH| of a threshold voltage of the first transistor T1, and the voltage of the first node Q1 may become the sum of the first low gate voltage VGL1 and the absolute value |VTH| of the threshold voltage.

FIG. 4 illustrates voltages of the first node Q1 with dotted lines in cases where the threshold voltage of each transistor (e.g., the first transistor T1) is shifted by about +2 V to about −2 V. As illustrated in FIG. 4, in the cases where the threshold voltage of each transistor (e.g., the first transistor T1) is shifted, the voltage of the first node Q1 may vary while the output signal OUT having the second low gate voltage VGL2 is output. However, even if the threshold voltage of each transistor (e.g., the first transistor T1) is shifted, as illustrated in FIG. 4, the output signal OUT may be normally output, and the stage 200 may stably operate. In such an embodiment, as illustrated in FIG. 4, while the output signal OUT having the second low gate voltage VGL2 is output, the voltage of the first node Q1 may be decreased by a parasitic capacitance of the first transistor T1 when the clock signal CLK periodically has the first low gate voltage VGL1, which may not affect an operation of the stage 200.

During the second time period TP2, the second transistor T2 may be turned on in response to the first low gate voltage VGL1, and may transmit the voltage VGL1+|VTH| of the first node Q1 to the second node Q2. Thus, the second node Q2 may be decreased from the high gate voltage VGH to the voltage VGL1+|VTH| of the first node Q1. When the voltage of the second node Q2 is decreased, the sixth transistor T6 may be turned on, the sixth transistor T6 may provide the second low gate voltage VGL2 to the output node NO, and a voltage of the output node NO may be decreased from the high gate voltage VGH. When the output node NO connected to the first electrode of the first capacitor C1 is decreased from the high gate voltage VGH, the voltage of the second node Q2 connected to the second electrode of the first capacitor C1 also may be further decreased from the voltage VGL1+|VTH| of the first node Q1. This operation of further decreasing or boosting the voltage of the second node Q2 may be referred to as a bootstrapping operation or a boosting operation. Accordingly, the second node Q2 may have a boosted low gate voltage BVGL2 lower than the second low gate voltage VGL2. In an embodiment, for example, in a case where the second low gate voltage VGL2 is about −9.5 V, the boosted low gate voltage BVGL2 may be, but is not limited to, about −15 V. The sixth transistor T6 may be fully or completely turned on in response to the boosted low gate voltage BVGL2, and the sixth transistor T6 may output the second low gate voltage VGL2 as the output signal OUT at the output node NO. Since the boosted low gate voltage BVGL2 of the second node Q2 is higher than the first low gate voltage VGL1 applied to the gate of the second transistor T2, the boosted low gate voltage BVGL2 of the second node Q2 may not be transmitted to the first node Q1.

Further, the fourth transistor T4 may be turned off in response to the boosted low gate voltage BVGL2 of the second node Q2, and the third transistor T3 may be turned on in response to the voltage VGL1+|VTH| of the first node Q1. The third transistor T3 may transmit the high gate voltage VGH to the third node QB. Thus, the third node QB may have the high gate voltage VGH. The fifth transistor T5 may be turned off in response to the high gate voltage VGH of the third node QB.

In the driver according to embodiments, the swing width of the clock signal CLK may be smaller than the swing width of the output signal OUT, and thus the power consumption of the driver may be reduced. Further, in the driver according to embodiments, even when the swing width of the clock signal CLK is reduced, the stage 200 and the driver may stably operate.

Figure 7:
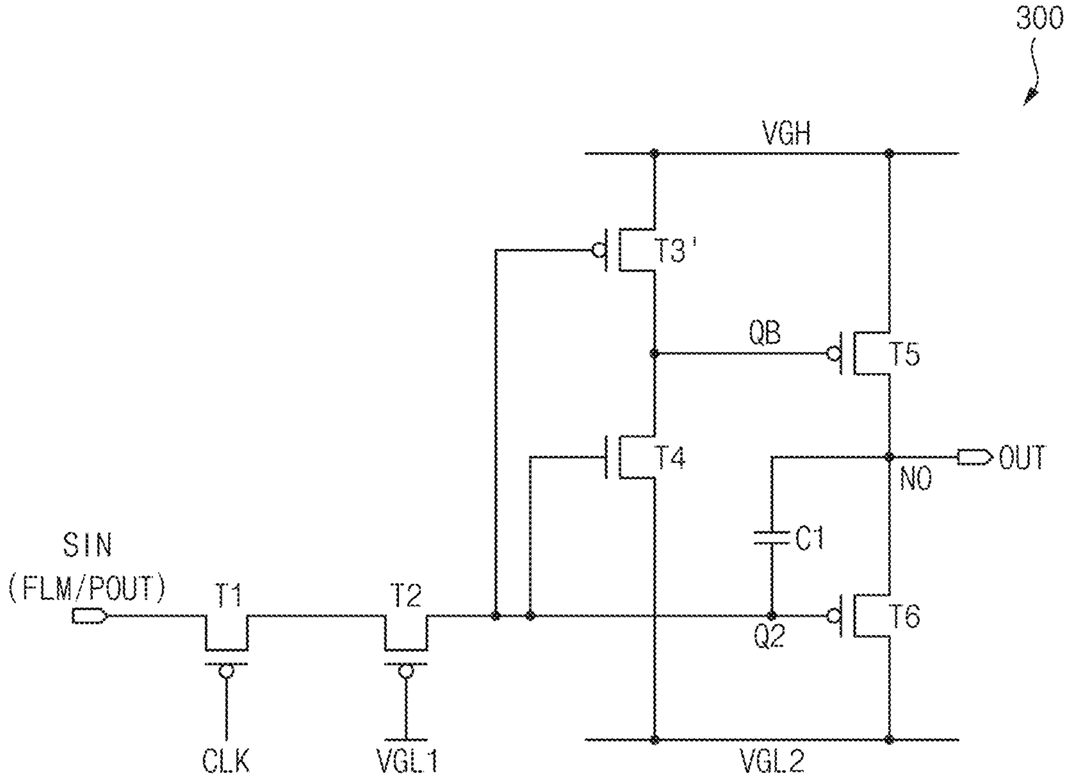
FIG. 7 is a circuit diagram illustrating a stage of a driver according to embodiments.

FIG. 7 is a circuit diagram illustrating a stage of a driver according to embodiments.

Referring to FIG. 7, a stage 300 of a driver according to embodiments may include a first transistor T1, a second transistor T2, a third transistor T3', a fourth transistor T4, a fifth transistor T5, a sixth transistor T6 and a first capacitor C1. The stage 300 of FIG. 7 may have substantially the same configuration and substantially the same operation as a stage 200 of FIG. 3, except that a gate of the third transistor T3' may be connected to a second node Q2.

In such an embodiment, the third transistor T3' may transmit a high gate voltage VGH to a third node QB in response to a voltage of the second node Q2. In some embodiments, the third transistor T3' may include a gate connected to the second node Q2, a first terminal connected to a line which transmits a high gate voltage VGH, and a second terminal connected to the third node QB.

Figure 8:
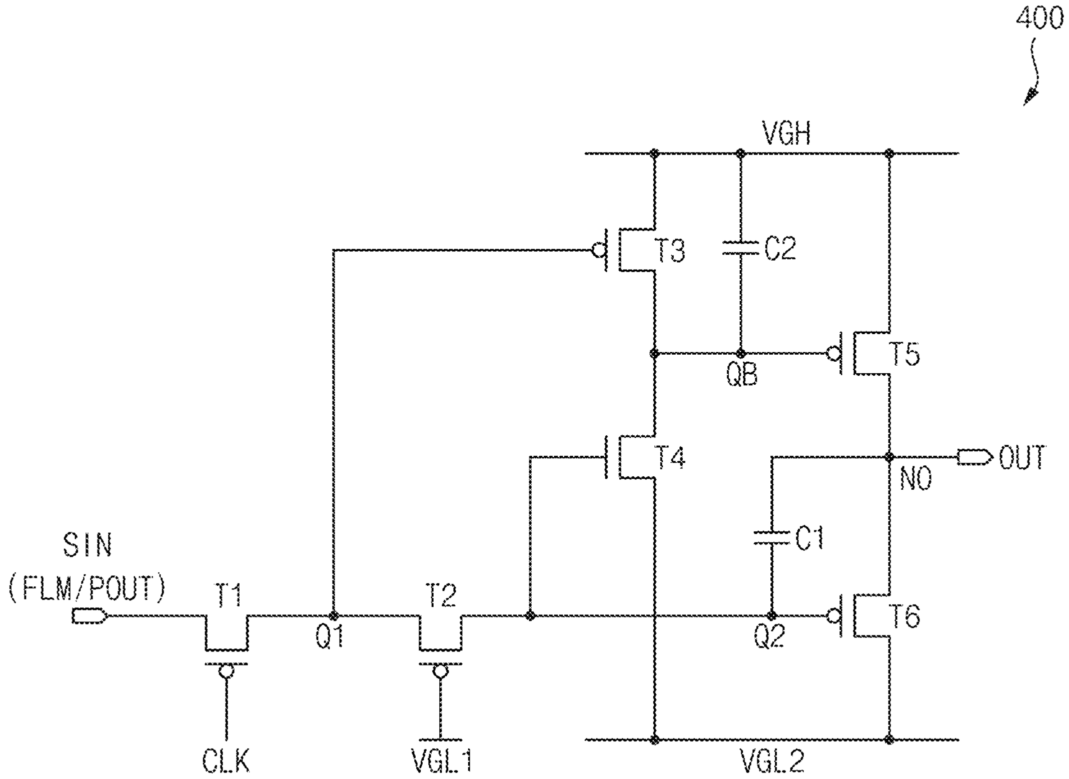
FIG. 8 is a circuit diagram illustrating a stage of a driver according to embodiments.

FIG. 8 is a circuit diagram illustrating a stage of a driver according to embodiments.

Referring to FIG. 8, a stage 400 of a driver according to embodiments may include a first transistor T1, a second transistor T2, a third transistor T3, a fourth transistor T4, a fifth transistor T5, a sixth transistor T6, a first capacitor C1 and a second capacitor C2. The stage 400 of FIG. 8 may have substantially the same configuration and substantially the same operation as a stage 200 of FIG. 3, except that the stage 400 may further include the second capacitor C2.

In such an embodiment, the second capacitor C2 may be connected between a line which transmits a high gate voltage VGH and a third node QB. The second capacitor C2 may hold a voltage of the third node QB. In some embodiments, the second capacitor C2 may include a first electrode connected to the line which transmits the high gate voltage VGH, and a second electrode connected to the third node QB.

Figure 9:
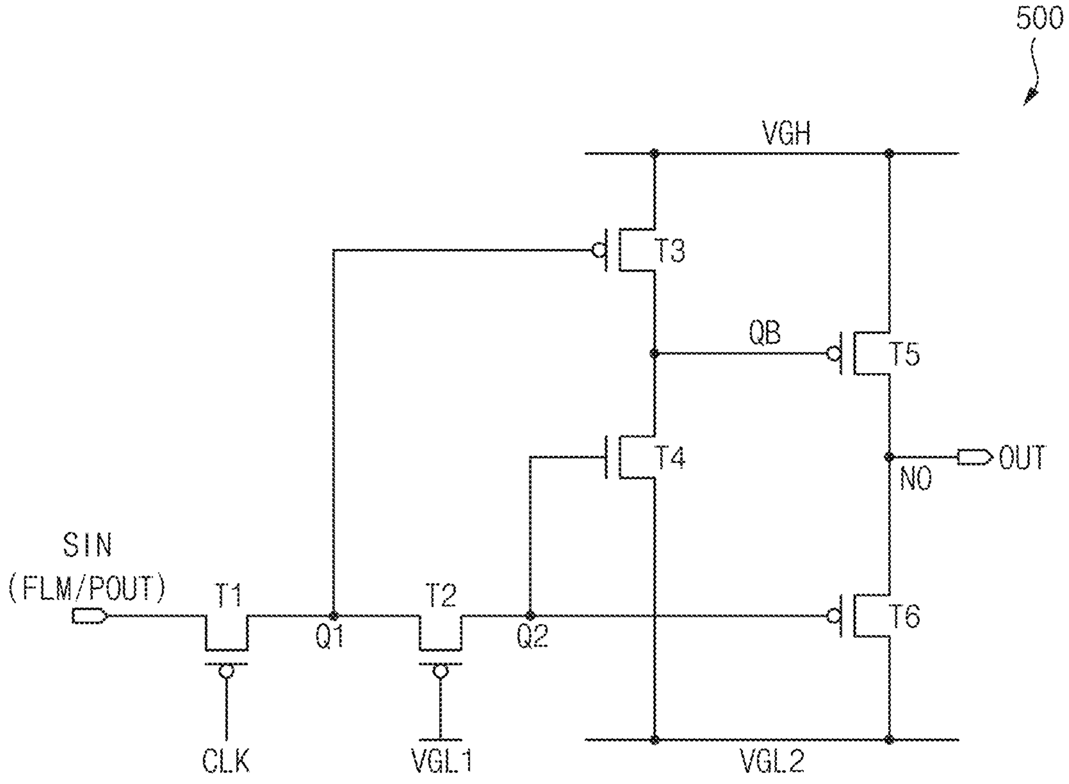
FIG. 9 is a circuit diagram illustrating a stage of a driver according to embodiments.

FIG. 9 is a circuit diagram illustrating a stage of a driver according to embodiments.

Referring to FIG. 9, a stage 500 of a driver according to embodiments may include a first transistor T1, a second transistor T2, a third transistor T3, a fourth transistor T4, a fifth transistor T5 and a sixth transistor T6. The stage 500 of FIG. 9 may have substantially the same configuration and substantially the same operation as a stage 200 of FIG. 3, except that the stage 500 may not include a first capacitor C1 illustrated in FIG. 3.

In such an embodiment where the stage 500 does not include the first capacitor C1 as illustrated in FIG. 3, a bootstrapping operation that boosts or further decreases a voltage of a second node Q2 may be performed by a parasitic capacitance of the sixth transistor T6. Accordingly, in such an embodiment where the stage 500 does not include the first capacitor C1 illustrated in FIG. 3, the stage 500 may normally operate.

Figure 10:
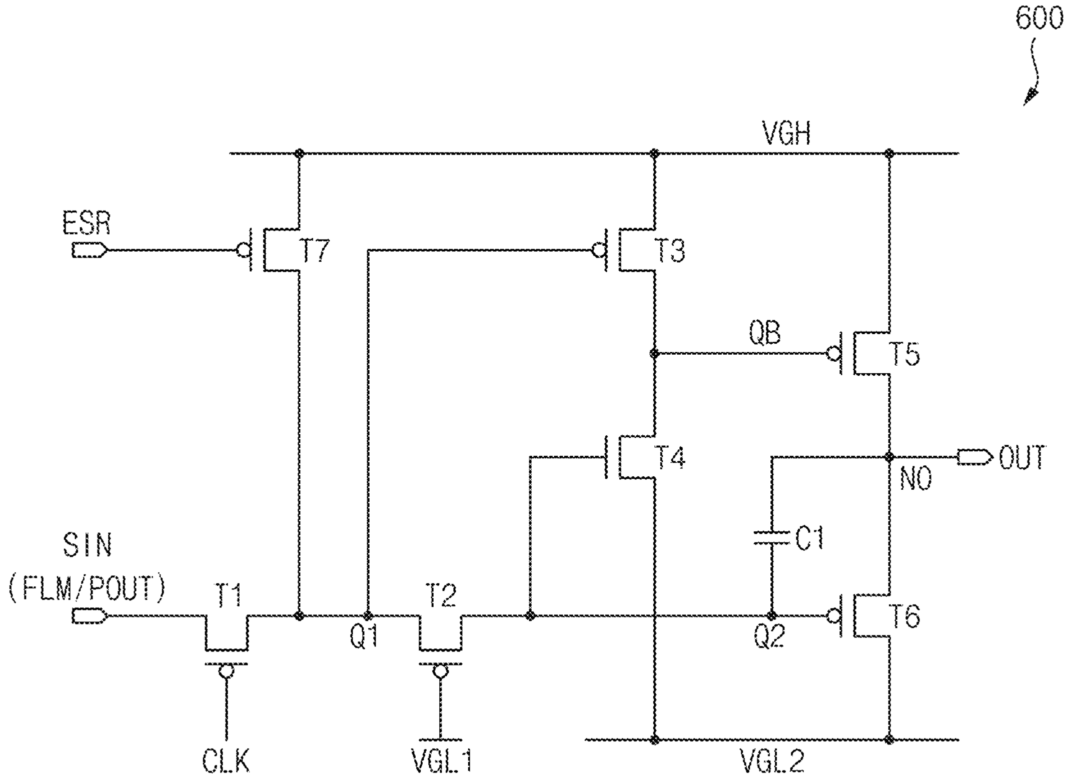
FIG. 10 is a circuit diagram illustrating a stage of a driver according to embodiments.

FIG. 10 is a circuit diagram illustrating a stage of a driver according to embodiments.

Referring to FIG. 10, a stage 600 of a driver according to embodiments may include a first transistor T1, a second transistor T2, a third transistor T3, a fourth transistor T4, a fifth transistor T5, a sixth transistor T6, a seventh transistor T7 and a first capacitor C1. The stage 600 of FIG. 10 may have substantially the same configuration and substantially the same operation as a stage 200 of FIG. 3, except that the stage 600 may further include the seventh transistor T7.

In such an embodiment, the seventh transistor T7 may transmit a high gate voltage VGH to a first node Q1 in response to a global reset signal ESR. In some embodiments, the global reset signal ESR may have a low level when a power-on sequence (or sequential operations for power-on) of a display device is performed, and may be simultaneously provided to a plurality of stages of the driver. Thus, the seventh transistors T7 of the plurality of stages may stabilize voltages of nodes Q1, Q2 and QB of the plurality of stages during the power-on sequence by transmitting the high gate voltage VGH to the first node Q1 during the power-on sequence. In some embodiments, the seventh transistor T7 may be, but is not limited to, a PMOS transistor. Further, in some embodiments, the seventh transistor T7 may include a gate which receives the global reset signal ESR, a first terminal connected to a line which transmits the high gate voltage VGH, and a second terminal connected to the first node Q1.

Those skilled in the art will appreciate that the embodiments for the stages 200, 300, 400, 500 and 600 of FIGS. 3, 7, 8, 9 and 10 can be combined in various ways. For example, in an embodiment where the embodiments for the stages 400 and 600 of FIGS. 8 and 10 are combined, each stage may include seven transistors T1 through T7 and two capacitors C1 and C2.

Figure 11:
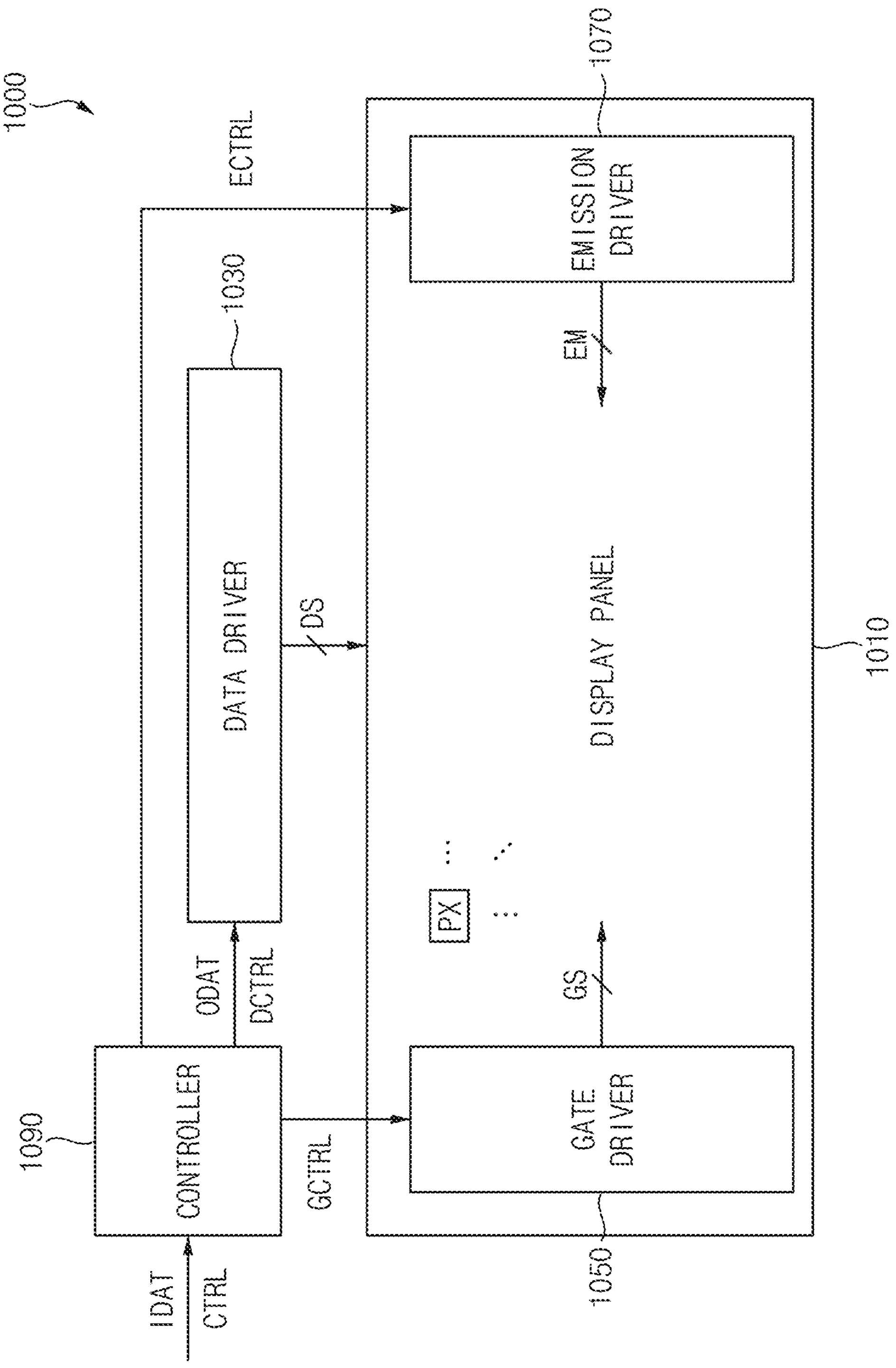
FIG. 11 is a block diagram illustrating a display device according to embodiments.

FIG. 11 is a block diagram illustrating a display device according to embodiments.

Referring to FIG. 11, a display device 1000 according to embodiments may include a display panel 1010 that includes a plurality of pixels PX, a data driver 1030 that provides data signals DS to the plurality of pixels PX, a gate driver 1050 that provides gate signals GS to the plurality of pixels PX, an emission driver 1070 that provides emission signals EM to the plurality of pixels PX, and a controller 1090 that controls the data driver 1030, the gate driver 1050 and the emission driver 1070.

The display panel 1010 may include data lines, gate lines, emission lines, and the plurality of pixels PX connected thereto. In some embodiments, each pixel PX may include a light emitting element, and the display panel 1010 may be a light emitting display panel. In some embodiments, the light emitting element may be an organic light emitting diode (OLED). In other embodiments, the light emitting element may be a nano light emitting diode (NED), a quantum dot (QD) light emitting diode, a micro light emitting diode, an inorganic light emitting diode, or any other suitable light emitting element. In still other embodiments, the display panel 1010 may be a liquid crystal display (LCD) panel, or any other suitable display panel.

The data driver 1030 may generate the data signals DS based on a data control signal DCTRL and output image data ODAT received from the controller 1090, and may provide the data signals DS to the plurality of pixels PX through the data lines. In some embodiments, the data control signal DCTRL may include, but is not limited to, an output data enable signal, a horizontal start signal, and a load signal. In some embodiments, the data driver 1030 and the controller 1090 may be implemented as a single integrated circuit, and the single integrated circuit may be referred to as a timing controller embedded data driver (TED) integrated circuit. In other embodiments, the data driver 1030 and the controller 1090 may be implemented as separate integrated circuits.

The gate driver 1050 may generate gate signals GS based on a gate control signal GCTRL received from the controller 1090, and may sequentially provide the gate signals GS to the plurality of pixels PX through the gate lines on a row-by-row basis. In some embodiments, the gate control signal GCTRL may include, but is not limited to, a gate start signal and a gate clock signal. In some embodiments, the gate driver 1050 may be a driver 100 of FIG. 1 including a stage 200 of FIG. 3, a stage 300 of FIG. 7, a stage 400 of FIG. 8, a stage 500 of FIG. 9 or a stage 600 of FIG. 10. Further, in some embodiments, as illustrated in FIG. 11, the gate driver 1050 may be integrated or formed in the display panel 1010. In other embodiments, the gate driver 1050 may be implemented with one or more integrated circuits.

The emission driver 1070 may generate the emission signals EM based on an emission control signal ECTRL received from the controller 1090, and may sequentially provide the emission signals EM to the plurality of pixels PX through the emission lines on the row-by-row basis. In some embodiments, the emission control signal ECTRL may include, but is not limited to, an emission start signal and an emission clock signal. In some embodiments, the emission driver 1070 may be a driver 100 of FIG. 1 including a stage 200 of FIG. 3, a stage 300 of FIG. 7, a stage 400 of FIG. 8, a stage 500 of FIG. 9 or a stage 600 of FIG. 10. Further, in some embodiments, as illustrated in FIG. 11, the emission driver 1070 may be integrated or formed in the display panel 1010. In other embodiments, the emission driver 1070 may be implemented with one or more integrated circuits.

The controller 1090 (e.g., a timing controller (TCON)) may receive input image data IDAT and a control signal CTRL from an external host processor (e.g., a graphics processing unit (GPU), an application processor (AP), or a graphics card). In some embodiments, the input image data IDAT may be RGB image data including red image data, green image data and blue image data. In some embodiments, the control signal CTRL may include, but is not limited to, a vertical synchronization signal, a horizontal synchronization signal, an input data enable signal, a master clock signal, etc. The controller 1090 may generate the output image data ODAT, the data control signal DCTRL, the gate control signal GCTRL and the emission control signal ECTRL based on the input image data IDAT and the control signal CTRL. The controller 1090 may control an operation of the data driver 1030 by providing the output image data ODAT and the data control signal DCTRL to the data driver 1030, may control an operation of the gate driver 1050 by providing the gate control signal GCTRL to the gate driver 1050, and may control an operation of the emission driver 1070 by providing the emission control signal ECTRL to the emission driver 1070.

In the display device 1000 according to embodiments, at least one of the gate driver 1050 and the emission driver 1070 may be implemented as the driver 100 of FIG. 1, and at least one stage within the driver 100 may have a simple configuration including first through sixth transistors. Further, in the driver 100, a swing width of a clock signal may be smaller than a swing width of an output signal. Accordingly, the driver 100 may stably operate while reducing power consumption.

Figure 12:
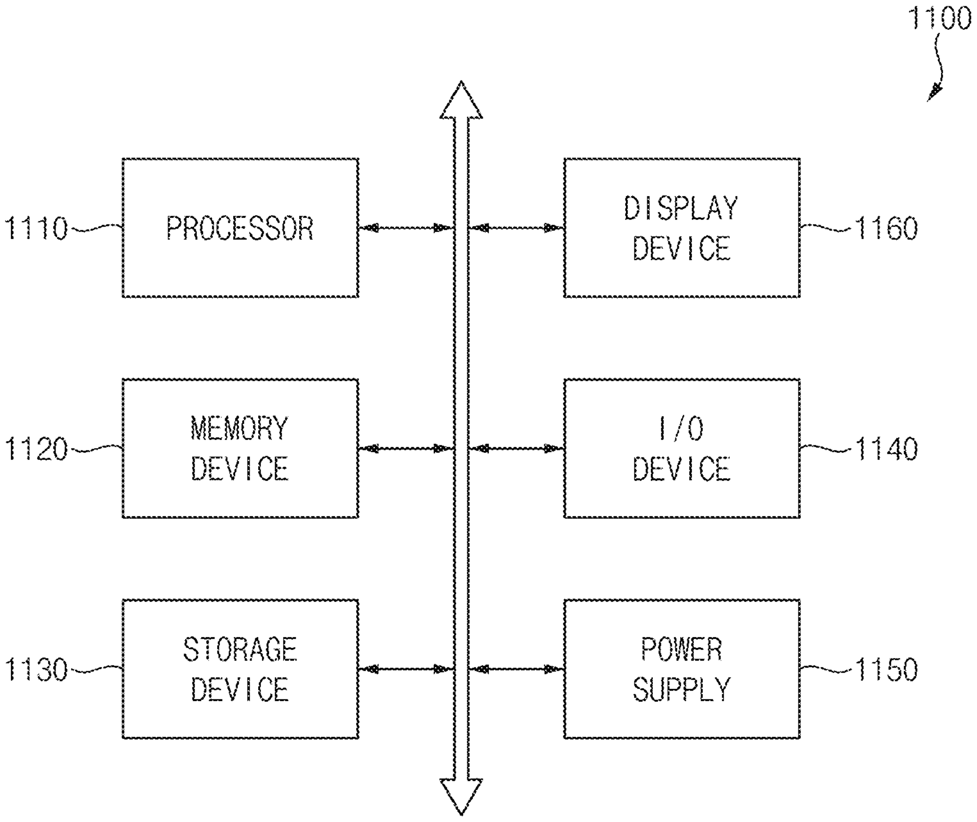
FIG. 12 is a block diagram illustrating an electronic device including a display device according to embodiments.

FIG. 12 is a block diagram illustrating an electronic device including a display device according to embodiments.

Referring to FIG. 12, an embodiment of an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. In an embodiment, for example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, at least one stage of a driver (e.g., a gate driver and/or an emission driver) may have a simple configuration including first through sixth transistors. Further, in the driver, a swing width of a clock signal may be smaller than a swing width of an output signal. Accordingly, the driver may stably operate while reducing power consumption.

The inventions may be applied to any display device 1160, and any electronic device 1100 including the display device 1160. For example, the inventions may be applied to a smart phone, a wearable electronic device, a mobile phone, a television (TV) (e.g., a digital TV, a three-dimensional (3D) TV, etc.), a personal computer (PC) (e.g., a tablet computer, a laptop computer, etc.), a home appliance, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A driver including a plurality of stages, a stage of the plurality of stages comprising:

a first transistor which transmits an input signal to a first node in response to a clock signal;

a second transistor connected between the first node and a second node, and including a gate which receives a first low gate voltage;

a third transistor which transmits a high gate voltage to a third node in response to a voltage of the first node or a voltage of the second node;

a fourth transistor which transmits a second low gate voltage to the third node in response to the voltage of the second node;

a fifth transistor which outputs the high gate voltage as an output signal in response to a voltage of the third node; and a sixth transistor which outputs the second low gate voltage as the output signal in response to the voltage of the second node, wherein the output signal has a swing width between the high gate voltage and the second low gate voltage, and wherein the clock signal has a swing width between the high gate voltage and the first low gate voltage.

2. The driver of claim 1, wherein the first low gate voltage is higher than the second low gate voltage.

3. The driver of claim 1, wherein the first, second, third, fifth and sixth transistors are P-type metal-oxide-semiconductor (PMOS) transistors, and wherein the fourth transistor is an N-type metal-oxide-semiconductor (NMOS) transistor.

4. The driver of claim 1, wherein the first transistor includes a gate which receives the clock signal, a first terminal which receives the input signal, and a second terminal connected to the first node.

5. The driver of claim 1, wherein the second transistor includes the gate connected to a line which transmits the first low gate voltage, a first terminal connected to the first node, and a second terminal connected to the second node.

6. The driver of claim 1, wherein the third transistor includes a gate connected to the first node, a first terminal connected to a line which transmits the high gate voltage, and a second terminal connected to the third node.

7. The driver of claim 1, wherein the third transistor includes a gate connected to the second node, a first terminal connected to a line which transmits the high gate voltage, and a second terminal connected to the third node.

8. The driver of claim 1, wherein the fourth transistor includes a gate connected to the second node, a first terminal connected to a line which transmits the second low gate voltage, and a second terminal connected to the third node.

9. The driver of claim 1, wherein the fifth transistor includes a gate connected to the third node, a first terminal connected to a line which transmits the high gate voltage, and a second terminal connected to an output node, from which the output signal is output.

10. The driver of claim 1, wherein the sixth transistor includes a gate connected to the second node, a first terminal connected to an output node, from which the output signal is output, and a second terminal connected to a line which transmits the second low gate voltage.

11. The driver of claim 1, wherein the stage further includes:

a first capacitor connected between an output node, from which the output signal is output, and the second node.

12. The driver of claim 1, wherein the stage further includes:

a second capacitor connected between a line which transmits the high gate voltage and the third node.

13. The driver of claim 1, wherein the stage further includes:

a seventh transistor including a gate which receives a global reset signal, a first terminal connected to a line which transmits the high gate voltage, and a second terminal connected to the first node.

14. An electronic device comprising:

a processor which provides input image data; and a display device which receives the input image data, and displays an image based on the input image data, the display device comprising:

a display panel including a plurality of pixels;

a data driver which provides data signals to the plurality of pixels;

a gate driver which provides gate signals to the plurality of pixels;

an emission driver which provides emission signals to the plurality of pixels; and a controller which controls the data driver, the gate driver and the emission driver, wherein at least one selected from the gate driver and the emission driver includes a plurality of stages, and wherein a stage of the plurality of stages includes:

a first transistor which transmits an input signal to a first node in response to a clock signal;

a second transistor connected between the first node and a second node, and including a gate which receives a first low gate voltage;

a third transistor which transmits a high gate voltage to a third node in response to a voltage of the first node or a voltage of the second node;

a fourth transistor which transmits a second low gate voltage to the third node in response to the voltage of the second node;

a fifth transistor which outputs the high gate voltage as an output signal in response to a voltage of the third node; and a sixth transistor which outputs the second low gate voltage as the output signal in response to the voltage of the second node, wherein the output signal has a swing width between the high gate voltage and the second low gate voltage, and wherein the clock signal has a swing width between the high gate voltage and the first low gate voltage.

15. The electronic of claim 14, wherein the first low gate voltage is higher than the second low gate voltage.

16. The electronic of claim 14, wherein the first, second, third, fifth and sixth transistors are P-type metal-oxide-semiconductor (PMOS) transistors, and wherein the fourth transistor is an N-type metal-oxide-semiconductor (NMOS) transistor.

17. The electronic of claim 14, wherein the first transistor includes a gate which receives the clock signal, a first terminal which receives the input signal, and a second terminal connected to the first node, wherein the second transistor includes the gate connected to a line which transmits the first low gate voltage, a first terminal connected to the first node, and a second terminal connected to the second node, wherein the third transistor includes a gate connected to the first node, a first terminal connected to a line which transmits the high gate voltage, and a second terminal connected to the third node, wherein the fourth transistor includes a gate connected to the second node, a first terminal connected to a line which transmits the second low gate voltage, and a second terminal connected to the third node, wherein the fifth transistor includes a gate connected to the third node, a first terminal connected to a line which transmits the high gate voltage, and a second terminal connected to an output node, from which, the output signal is output, and wherein the sixth transistor includes a gate connected to the second node, a first terminal connected to the output node and a second terminal connected to a line which transmits the second low gate voltage.

18. The electronic of claim 14, wherein the stage further includes:

a first capacitor connected between an output node, from which the output signal is output, and the second node.

* * * * *